United States Patent
Trubnikov et al.

(10) Patent No.: US 10,000,648 B2
(45) Date of Patent: *Jun. 19, 2018

(54) PHOTO-CURABLE INK COMPOSITION

(75) Inventors: Alex Trubnikov, Petach Tiqwa (IL); Ziv Belman, Kiryat-Yam (IL); Eytan Cohen, Raanana (IL)

(73) Assignee: HP SCITEX LTD., Netanya (IL)

(*) Notice: Subject to any disclaimer, the term of this patent is extended or adjusted under 35 U.S.C. 154(b) by 641 days.

This patent is subject to a terminal disclaimer.

(21) Appl. No.: 14/349,055

(22) PCT Filed: Oct. 9, 2011

(86) PCT No.: PCT/IL2011/000794
§ 371 (c)(1),
(2), (4) Date: Apr. 1, 2014

(87) PCT Pub. No.: WO2013/054317
PCT Pub. Date: Apr. 18, 2013

(65) Prior Publication Data
US 2014/0249243 A1   Sep. 4, 2014

(51) Int. Cl.
*C09D 11/30* (2014.01)
*C09D 11/10* (2014.01)
*B41J 2/01* (2006.01)
*C09D 11/101* (2014.01)
*C09D 11/322* (2014.01)

(52) U.S. Cl.
CPC .............. *C09D 11/30* (2013.01); *B41J 2/01* (2013.01); *C09D 11/101* (2013.01); *C09D 11/322* (2013.01)

(58) Field of Classification Search
CPC ..... C09D 11/101; C09D 11/90; C09D 11/322; B41J 2/01
See application file for complete search history.

(56) References Cited

U.S. PATENT DOCUMENTS

| | | |
|---|---|---|
| 4,888,269 A | 12/1989 | Sato et al. |
| 5,439,956 A | 8/1995 | Noguchi |
| 6,326,419 B1 | 12/2001 | Smith |
| 6,550,905 B1 | 4/2003 | Deckers |
| 7,304,095 B2 | 12/2007 | Masumi et al. |
| 7,723,400 B2 | 5/2010 | Kobayashi et al. |
| 7,893,127 B2 | 2/2011 | Nagvekar et al. |
| 9,187,666 B2* | 11/2015 | Brandstein .......... C09B 67/0002 |
| 2005/0080152 A1 | 4/2005 | Bergiers et al. |
| 2010/0304149 A1 | 12/2010 | Loccufier et al. |
| 2013/0029046 A1* | 1/2013 | Heischkel ............ C09D 11/101 427/256 |
| 2014/0302289 A1* | 10/2014 | Duzy .................. B41M 7/0081 428/201 |

FOREIGN PATENT DOCUMENTS

| | | |
|---|---|---|
| CN | 1580149 | 2/2005 |
| CN | 101348634 | 1/2009 |
| DE | 102009046130 | 5/2010 |
| EP | 2325270 | 5/2011 |
| JP | S60208377 | 10/1985 |
| JP | 2009073945 | 4/2009 |
| JP | 2009073945 A * | 4/2009 |
| WO | WO 2010/125373 | 11/2010 |

OTHER PUBLICATIONS

Laromer LR9013 provisional techinal datasheet from BASF. (Sep. 2001). retrieved online. retrieved on [Jun. 26, 2016]. Retrieved from interner <URLhttp://www.xtgchem.cn/upload/20110629122654.pdf>.*

* cited by examiner

*Primary Examiner* — Sanza Mcclendon
(74) *Attorney, Agent, or Firm* — HP Inc. Patent Department

(57) ABSTRACT

A photo-curable ink composition including an acrylic polymer or copolymer, a vinyl ester component, a multifunctional monomer, a photoinitiator and a pigment. Also disclosed herein is a method for forming a printed article and an ink-jet ink printing system using said photo-curable ink composition.

18 Claims, No Drawings

PHOTO-CURABLE INK COMPOSITION

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Inks used in such technologies can be liquid dispersions, solution, or emulsions and can include oil-based inks, non-aqueous solvent based inks, water-based inks and solid inks. Current inkjet printing technology involves forcing the ink drops through small nozzles by thermal ejection, piezoelectric pressure or oscillation, onto the surface of a media. The deposited ink droplets are, then, dried, e.g., using heat or forced air; or allowed to dry at ambient conditions.

Recently, curing of ink by radiation, and in particular ultraviolet (UV) curing, has become popular. In these cases, special ink is used and the image is cured by exposure to a radiation source. The uses of such radiation-curable (or photo-curable) inks and the curing process are rapidly becoming an alternative to the established conventional drying process.

However, radiation-curable (or photo-curable) ink compositions are noticeably limited among available options due to their specific features. Accordingly, investigations continue into developing ink compositions that exhibit, when printed, specific and excellent printing properties such as, for example, jetting properties, good weatherability, as well as improved adhesion and high elongation.

DETAILED DESCRIPTION

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. All percents are by weight (wt %) unless otherwise indicated.

The present disclosure refers to a photo-curable ink composition containing an acrylic polymer or copolymer, a vinyl ester component, a multifunctional monomer, a photoinitiator and a pigment. Also disclosed is a method for forming a printed article with said photo-curable ink composition and an ink-jet ink printing system including said photo-curable ink composition. The present disclosure refers also to a method for preparing a photo-curable ink composition containing an acrylic polymer or copolymer, a vinyl ester component, a multifunctional monomer, a photoinitiator and a pigment.

The ink composition is photo-curable (or UV-curable or radiation-curable) ink composition. Said composition is a jettable ink composition meaning thus that the ink can be used with ink jet printing device. In some examples, the ink composition is "substantially free of solvent".

The term "curing" in the context of the present disclosure refers to a process of converting a liquid, such as ink, into a solid by exposure to actinic radiation such as photo radiation, e.g., ultraviolet (UV) radiation. In the uncured state, the ink compositions have a low viscosity and are readily jetted. However, upon exposure to a suitable source of curing energy, for example ultraviolet (UV) light, electrons beam energy, and/or the like, there is a formation of a cross-linked polymer network. Such ink compositions are commonly referred to as "energy-curable" inks to distinguish them from "solvent-based" inks.

Photo-curable ink compositions often have poor adhesion to non-porous or low surface energy substrates such as polypropylene, polyolefins or acrylics surfaces. Polypropylene, for example, is widely used for rigid and semi-rigid Point-of-Purchase displays. Because the surface of the polypropylene is inert and has low surface energy, polar solvents will not wet it. As a result, a poor adhesion is obtained. Additionally, depending on the ink load, when printing inks on top of one another, proper cohesion between ink layers on substrate can be less than desirable. Furthermore, photo-curable ink compositions often have a viscosity that is higher than other inks such as water-based inks. The jetting of such photo-curable ink compositions can thus present certain difficulties, and further, such inks can only be jetted at low frequencies, causing slower printing speeds. Because these inks are more viscous, they are also usually jetted at elevated temperatures, e.g., above about 40° C. This elevated temperature allows some control over the inks high viscosity, but adversely affects the life of printing architecture including the printhead.

In some examples, the photo-curable ink composition of the present disclosure can be printed in a broad selection of substrates and has a good adhesion on variety of substrates, specifically on plastic substrates such as PVC, acrylic, polycarbonate and on substrates such as polypropylene. The photo-curable ink composition has a good viscosity that enables good printing performances and enables the ability to formulate inks suitable for inkjet application. The photo-curable ink composition of the present disclosure enables thus high printing speed. Furthermore, the photo-curable ink composition as described herein exhibits high elongation properties. Such ink is thus particularly well suited for use in digital inkjet printing.

The photo-curable ink composition can be digitally printed onto flat sheet constructions, such as papers, plastics, banner materials and the like. In some examples, the photo-curable ink composition of the present disclosure has improved adhesion to non-polar surfaces, good jetting properties, good weatherability and high elongation performances. The ink composition possesses good scratch resistance and weatherability; the ink composition supports high curing speed, operational flexibility, while having a viscosity enabling good jetting properties.

In some examples, the ink composition has a viscosity at 25° C. of not greater than about 70 cps; of not greater than about 50 cps, or, of not greater than about 30 cps. In some other examples, the viscosity of the ink composition is ranging from about 10 cp to about 25 cp at a jetting temperature of about 30° C. to about 60° C. The ink composition can have a static surface tension, at 25° C., of not greater than about 40 dynes/cm.

In some examples, the ink composition is a radiation curable ink that is able to form a cured ink having an elongation of at least 50%, or having an elongation of at least 100%, or having an elongation of at least 130%. As elongation, it is meant herein, the fact that the ink is able to stretch along curing without affecting the print quality. Cured compositions with elongation characteristics greater than about 50% are beneficially used to reduce stress cracks, improve toughness, and improve weatherability.

In some examples, the photo-curable ink composition encompasses an acrylic polymer or copolymer. Suitable acrylic polymer or copolymers include components such as styrene acrylic resins, butyl methacrylate resins, isobutyl methacrylate resins, methyl methacrylate resins and combinations thereof. In some examples, the acrylic polymer or copolymer is an isobutyl methacrylate resin. Such components exhibit excellent adhesion to non-polar substrates with low surface energy (like polyolephines).

The acrylic polymer or copolymer component may have an average molecular weight in the range of about 1,000 to about 60,000 g/mole; or, in the range of about 5,000 to about 20,000 g/mole. In some examples, the acrylic polymer or copolymer component has a glass transition temperature (Tg) that is below 60° C. The way of measuring the glass transition temperature (Tg) parameter is described in, for example, Polymer Handbook, 3rd Edition, authored by J. Brandrup, edited by E. H. Immergut, Wiley-Interscience.

In some other examples, the acrylic polymer or copolymer component is present in the ink composition in an amount representing from about 5 to about 25 wt % of the total weight of the ink composition. In some other example, the acrylic polymer or copolymer component is present in an amount representing from about 7 to about 20 wt % of the total weight of the ink composition.

In some examples, the ink composition includes vinyl ester component. The vinyl ester component is a compound that contains a divinyl ester of a dicarboxylic acid. Such compound can contain then, at least, two vinyl esterified carboxylic acid groups. The phrase "dicarboxylic acid" refers to an organic acid that contains, for example, from 2 to 8 carbon atoms, and two carboxylic acid groups, which is, —COOH groups, for example, where the number of carbon atoms of the carboxylic acid group is included in the number of carbon atoms referred to above. Dicarboxylic acids that may be employed herein include, but are not limited to, oxalic acid, malonic acid, succinic acid, glutaric acid, adipic acid, cyclohexyl dicarboxylic acid, phthalic acid, terephthalic acid, and pimelic acid, for example.

The phrase "divinyl ester" refers to vinyl moieties that are attached to two carboxylic acid groups of the dicarboxylic acid where the form of attachment is an ester bond. The phrase "vinyl moieties" refers to organic moieties that contain, at least, one carbon-carbon double bond. The vinyl moiety may include one or more substituents in place of one or more of the hydrogen's of the vinyl moiety. Such substituents include, by way of illustration and not limitation, alkyl groups, an aryl groups, and an alkaryl groups, for example.

In some examples, the compound containing a divinyl ester of the dicarboxylic acid has a viscosity of about 0.5 to about 15 millipascal seconds (mpas), or of about 0.5 to about 10 mpas, or of about 1 to about 5 mpas. In some other examples, the divinyl ester of the dicarboxylic acid has a vapor pressure less than about 0.1 millibar (mbar), or less than about 0.01 mbar. In yet some other examples, the divinyl ester of the dicarboxylic acid has a boiling point greater than about 150° C. or greater than about 230° C.

An amount of the compound comprising a vinyl ester of a dicarboxylic acid in the ink composition is chosen to be at an optimum amount that enables high pigment loading, good ink rheology, low viscosity and improved storage stability. In some examples, the vinyl ester component is present in the ink composition in an amount representing from about 1 to about 60 wt % of the total weight of the ink composition. In some other example, the vinyl ester component is present in an amount representing from about 10 to about 50 wt % of the total weight of the ink composition. In yet some other examples, the vinyl ester component is present in an amount representing from about 20 to about 45 wt % of the total weight of the ink composition.

In accordance with the principles described herein, the vinyl ester component can be adipic acid divinyl ester (AVES), cyclohexyl dicarboxylic acid divinyl ester (CH-DVES), terephthalic acid divinyl ester (TVES), or any combination thereof. In some examples, the vinyl ester component is adipic acid divinyl ester (AVES). In some other examples, the vinyl ester component is AVES, which has a viscosity of about 2.5 mpas at 30° C., a vapor pressure less than 0.01 mbar and a boiling point greater than 230° C. Without being linked by any theory, it is believed that such AYES monomer serves as a good diluent for acrylic polymer or copolymer assisting in the adhesion of the ink image to the surface of substrate and curing.

The photo-curable ink composition includes a multifunctional monomer. A multifunctional monomer is a compound containing more than one functional groups that are capable of participating in the curing reaction, for example a polymerization reaction, during curing of the ink or coating. In particular, the multifunctional monomer includes more than one functional group that reacts in a free radical curing reaction, such as an ethylenically unsaturated functional group, for example a vinyl or acrylate functional group. The term "multifunctional monomer" refers to the monomer, other than vinyl ester component, containing more than one polymerizable functional group per molecule. In some examples, the multifunctional monomer is a di-functional monomer, i.e. contains two polymerizable functional groups per molecule.

The multifunctional monomer can be acrylate monomers containing ethylenically unsaturated radiation curable functional groups. Examples of such functional, radiation curable monomers may include 3-methyl 1,5-pentanediol diacrylate, hexanediol di(meth)acrylate, tetraethylene glycol di(meth)acrylate, trimethylolpropane tri(meth)acrylate, ethoxylated trimethylolpropane tri(meth)acrylate, tris(2-hydroxyethyl)isocyanurate triacrylate, pentaerythritol tri(meth)acrylate, ethoxylated (4) pentaerythritol tetraacrylate, neopentyl glycol di(meth)acrylate, combinations of these, and the like.

In some other examples, the multifunctional monomer is selected from the group consisting of ethoxylated (4) pentaerythritol tetraacrylate, tetraethylene glycol diacrylate, propoxylated ethylene glycol diacrylate, dipentaerythritol pentaacrylate and their combinations.

Without being linked by any theory, it is believed that multifunctional monomer enhances curing speed of the composition and may serve as a diluent for acrylic polymer or copolymer. A combination of two or more multifunctional monomers may be used to optimize ink properties. In some examples, the multifunctional monomer is present, in the photo-curable ink composition, in an amount representing from about 5 to about 35 wt % of the total weight of the ink composition. In some other example, the multifunctional monomer is present in an amount representing from about 10 to about 30 wt % of the total weight of the ink composition.

In some examples, the ink composition contains a photoinitiator. The photoinitiator, or UV initiator, is an agent that initiates a reaction upon exposure to a desired wavelength of UV light to cure the ink composition, as described herein, after its application to an ink-receiving material or substrate. In some examples, the photoinitiator is a radical photoinitiator. The photoinitiator may be a single compound or a mixture of two or more compounds. The photoinitiator can be present in the ink composition in an amount sufficient to cure the applied ink composition. In some examples, the photoinitiator is present in the ink composition in an amount representing from about 0.01 to about 10 wt %, or from about 1 to about 5 wt % by weight, based on the total weight of the photo-curable ink composition.

Examples of radical photoinitiator include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl) phosphine oxide, phenyl bis(2,4,6-trimethylbenzoyl)phosphine oxide, 2-hydroxy-2-methyl-1-phenyl-1-propanone, benzyl-dimethyl ketal, isopropylthioxanthone. Amine synergists may also be used, such as, for example, ethyl-4-dimethylaminobenzoate, 2-ethylhexyl-4-dimethylamino benzoate, 2-methyl-1-[4-(methylthio)phenyl]-2-morpholinopropan-1-one (Omnirad®4817 from IGM Resins, Bartlett Ill.), 2,4,6-trimethylbenzoyl-diphenyl phosphine oxide (Omnirad® TPO from IGM Resins), 2-isopropylthioxanthone (Omnirad® ITX from IGM Resins), and bis(2,4,6-trimethylbenzoyl)-phenylphosphine-oxide (Igracure®819 from BASF Corporation), or combinations of two or more of the above.

The photo-curable ink composition may include a UV stabilizer, i.e. an agent that can assist with scavenging free radicals. Examples of UV stabilizers include, by way of illustration and not limitation, quinine methide (Irgastab® UV 22 from BASF Corporation) and Genorad®16 (Rahn USA Corporation) and combinations thereof.

The ink compositions may include one or more pigments as colorants. Insoluble pigment colorants can assist in achieving a better image performance. The pigments can be self-dispersed pigments, polymer-coated pigments, or common pigments such as milled pigments, for example. A separate dispersing agent may be used to enable appropriate suspension of the pigment in the ink composition. The particulate pigment may be inorganic or organic. The pigment can be of any color including, but not limited to, black, blue, brown, cyan, green, white, violet, magenta, red, orange and yellow, as well as spot colors from mixtures thereof.

Examples of organic pigments that may be present in the photo-curable ink composition include, by way of illustration and not limitation, perylenes, phthalocyanine pigments (for example, phthalo green, phthalo blue), cyanine pigments (Cy3, Cy5, and Cy7), naphthalocyanine pigments, nitroso pigments, monoazo pigments, diazo pigments, diazo condensation pigments, basic dye pigments, alkali blue pigments, blue lake pigments, phloxin pigments, quinacridone pigments, isoindolinone pigments, dioxazine pigments, carbazole dioxazine violet pigments, alizarine lake pigments, phthaloxy amine pigments, carmine lake pigments, tetrachloroisoindolinone pigments, perinone pigments, thioindigo pigments, anthraquinone pigments and quinophthalone pigments, and mixtures of two or more of the above and derivatives of the above.

Inorganic pigments that may be present in the ink composition, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

Examples of pigment colorants that may be employed include, by way of illustration and not limitation, yellow pigments having the following Yellow Pigment color index PY 83, PY 151, PY 150, PY 155, PY 139, PY120, PY180, PY 129 and PY 154, PY213. Magenta pigments composed of Red pigment having color indices of PR 202, PR 254, PR 122, PR149, PR185, PR255, PR146 and Violet pigment having color indices of PV 19, PV 23, PV37 and PV 29 may be used. Blue pigments having color indices of PB 15:3, PB 15:4, PB15:2 and PB15:1, as well as black pigments having color indices of PBL Black 7 also may be utilized. Inorganic pigment such as a white pigment of the type $TiO_2$ also may be used. Orange pigment having color indices of PO46, PO64, PO34 as well as green pigments having color index of PG7 also may be employed.

The pigment component can be a dispersible pigment, such as, for example, pigment available under the trade names Paliotol®, Heliogen®, Chromophtal®, Irgalite®, Cinquasia® (available from BASF), Hostaperm®, Novoperm® (available from Clariant), Sunfast®, Quindo® (available from SunChemical), Special Black (available from Degussa), Kronos® available from Kronos), Kemira® (available from Kemira Pigments).

The amount of the pigment in the photo-curable ink composition depends on a number of factors, for example, the nature of the pigment, the nature of the use of the ink composition, the nature of the jetting mechanism for the ink, and the nature of any additives, for example. The ink composition may contain up to 20 wt % of pigment. In some example, the amount of pigment in the photo-curable ink composition is from about 0.1 to about 20 wt %, or from about 1 to about 15 wt %, or from about 5 to about 10 wt %.

Other components and additives may be present in the photo-curable ink composition in order to improve ink properties and performances. The additives include, but are not limited to, one or more of surfactants or wetting agents (e.g., surfactants containing silicone compounds or fluorinated compounds), dispersing agents, rheology modifiers, anti-molding agents, anti-foaming agents, and stabilizers such as, e.g., storage stability enhancing agents, for example. The total amount by weight of additives in the ink composition is, for example, from about 0.1 to about 1 wt % or, from about 0.2 to about 0.5 wt %.

Surfactants include, for example, those commercially available under the brand names: WET® and GLIDE® (from Evonik Tego Chemie GmbH, Essen, Germany); BYK® (from BYK Chemie GmbH, Wesel, Germany); Dynax® (from Dynax Corp. Pound Ridge N.Y.); 3M Novec® (from 3M Energy and Advanced Materials, St. Paul Minn.); and Zonyl® FSO (from DuPont de Nemours Company, Wilmington Del.).

Examples of anti-foaming agents are those commercially available under the brand names: Foamex® and Twin® (from Evonik Tego Chemie Service GmbH); BYK® (from BYK Chemie GmbH); and Surfynol® (from Air Products and Chemicals, Inc.).

Examples of dispersants include high molecular weight copolymers with groups having an affinity for a pigment. Specific examples of dispersants include those commercially available from BYK Chemie GmbH under the brand names BYK®.

Examples of rheology modifiers include, those commercially available under the brand names: Acrysol® (from Rohm & Haas); Borchigel® (from OMG Borchers GmbH, Langenfield, Germany); BYK® (from BYK Chemie GmbH); and DSX® (from Cognis GmbH, Monheim am Rhein, Germany).

In accordance with the principles described herein, the photo-curable ink compositions find use as inkjet inks for inkjet printers. In some examples, the photo-curable ink compositions may be dispensed to the surface of a broad range of substrates employing inkjet technology and equipment.

In some embodiments, a method for forming a printed article includes: providing a photo-curable ink composition containing an acrylic polymer or copolymer, a vinyl ester component, a multifunctional monomer, a photoinitiator and a pigment; providing a media substrate; jetting said photo-curable ink composition onto the media substrate; and applying photo energy to the ink composition once printed on the media substrate, said photo energy having a frequency and energy level suitable for curing the photo-curable ink composition.

In some examples, the projection of the stream of droplets of ink composition, onto the media substrate, is done via inkjet printing technique. The ink composition may be established on the material via any suitable printing technique. Non-limitative examples of such techniques include thermal, acoustic, continuous and piezoelectric inkjet printing. In inkjet printing devices, liquid ink drops are applied in a controlled fashion to an ink-receiving substrate, or media substrate, by ejecting ink droplets from a plurality of nozzles, or orifices, in a print head of an inkjet printing device or inkjet printer. In drop-on-demand systems, a droplet of ink is ejected from an orifice directly to a position on the surface of an ink-receiving substrate, or media substrate, by pressure created by, for example, a piezoelectric device, an acoustic device, or a thermal process controlled in accordance digital data signals. For inkjet printing, the ink composition can be heated or chilled to an appropriate dispensation temperature, prior to ejecting the ink composition to the surface of a substrate. Considerations regarding temperature and viscosity of the ink composition relate to the effect on droplet size and droplet ejecting rate, for example.

For applying photo energy, the photo-curable ink composition, on the media substrate, may be subjected to suitable light sources for curing the ink compositions in accordance with the principles described herein. Ultraviolet (UV) radiations can be used to cure the ink composition as described above. Curing radiation can be UV radiation radiated by UV lamps, blue lasers, UV lasers, or ultraviolet LEDs, for example. The curing radiation may be provided by a source of ultraviolet radiation operating in a continuous mode. The curing radiation may also be provided by a source of ultraviolet operating in a flash or pulsed mode.

As mentioned, the photo-curable ink composition is jetted onto a media substrate. The media substrate may be planar, either smooth or rough, or have any other shape that is suitable for the particular purpose for which it is employed. The media substrate can have a thickness in the range of about 0.1 mm to about 10 mm or in the range of about 1 mm to about 5 mm. The media substrate may be porous or non-porous, rigid, semi-rigid, or flexible, for example. Planar media substrates may be in the form, for example, of a film, plate, board, or sheet by way of illustration and not limitation.

Examples of media substrate include, but are not limited to, plastic substrates (for example, cellulose diacetate, cellulose triacetate, cellulose propionate, cellulose butyrate, cellulose acetate butyrate, nitrocellulose, polyethylene terephthalate, polyethylene, polystyrene, polypropylene, polycarbonate, polyvinyl acetal, and acrylic), paper, paper laminated with plastic (for example, polyethylene, polypropylene, or polystyrene), cardboard, paperboard, foam board, and textiles.

In some examples, the media substrate is non-porous and has low surface tension. Non-limiting examples include plastics, PVC, banner paper, and polypropylenes, and synthetic paper, such as Yupo® synthetic paper. Banner paper is specifically configured for printing banners, has a smooth surface, and is often designed for color printing. The term "non-porous" includes surfaces that can have relatively poor water permeability, absorption, and/or adsorption. Vinyl and other plastic sheets or films, metals, coated offset media, glass, and other similar substrates are considered non-porous.

The media substrate can be a plastic substrate. In some examples, the media substrate is a polypropylene, a polyvinyl chloride (PVC), an acrylic or a polycarbonate substrate. In some other examples, the media substrate is a polypropylene substrate. In yet some other examples, the media substrate is an acrylic substrate.

The media substrates can be non-swellable and/or are non-polar. By non-swellable, it is meant herein that the substrate surface is not swelled by any components of the ink, and no chemical bonds are formed between ink and substrate. By non-polar, it is meant herein that the substrate surface is charge-neutral, therefore adhesion to it is difficult to achieve.

In some embodiments, the present disclosure refers to an inkjet ink printing system that include a media substrate; at least one photo-curable ink composition containing an acrylic polymer or copolymer, a vinyl ester component, a multifunctional monomer, a photoinitiator and a pigment; and a photo energy source configured to apply photo energy to the ink composition once printed on a substrate, said photo energy having a frequency and energy level suitable for curing the photo-curable ink-jet ink. In some examples, the photo energy source is a UV light source having a frequency and energy level suitable for curing the photo-curable ink-jet ink.

In some other embodiments, the present disclosure refers to method for preparing the above mentioned photo-curable ink composition. The method includes providing, in combination, an acrylic polymer or copolymer, a vinyl ester component, a multifunctional monomer, a photoinitiator and a pigment; subjecting the combination to conditions under which the ink composition becomes substantially uniform and have viscosity and surface tension suitable for jetting; and subjecting the combination to filtration. The photo-curable ink composition can be prepared by dissolving an acrylic polymer or copolymer in vinyl ester components under high-shear. The resulting solution can then be mixed with multifunctional monomer and pigment preparation (millbase), which is prepared separately by milling the pigment with dispersing agent and vehicle (multifunctional monomer) in a bead mill. The photoinitiator system can be added to the mix. The mixture is subsequently subjected to high shear mixing in view of dissolving the photoinitiator. The mixture becomes uniform and can be subjected to filtration.

EXAMPLES

1—List of Ingredients

TABLE A

| Component name | Ingredient type | Supplier |
|---|---|---|
| Adipic acid divinyl ester (AVES) | vinyl ester | BASF Corporation |
| MB7022 | Acrylic polymer | Dianal America |
| BR115 | Acrylic polymer | Dianal America |
| Irgacure ®819 | Photo-initiator | BASF Corporation |
| Irgacure ®907 | Photo-initiator | BASF Corporation |
| Irgastab ®UV22 | Photo-initiator | BASF Corporation |
| Irgacure ®1173 | Photo-initiator | BASF Corporation |
| Irgacure ®TPO | Photo-initiator | BASF Corporation |
| Darocur ®ITX | Photo-initiator | RAHN |
| Propoxylated neopentyl glycol diacrylate | Milling vehicle | Sartomer |
| Irgalite ®GLVO | Cyan pigment | BASF Corporation |
| Solsperse ®32000 | dispersant | Lubrizol Corporation |
| BYK 307 ® | surfactant | BYK |
| Ethoxylated (4) pentaerythritol tetraacrylate | multifunctional monomer | Sartomer |
| Tetraethylene glycol diacrylate | Di-functional monomer | Sartomer |
| Propoxylated Ehylene Glycol Diacrylate | Di-functional monomer | Sartomer |
| Propoxylated neopentyl glycol diacrylate | Di-functional monomer | Sartomer |
| Di-Pentaerythritol Pentaacrylate | multi-functional monomer | Sartomer |
| Diethylene glycol butyl ether acrylate | mono-functional monomer | Sartomer |
| Tetrahydrofurfuryl acrylate | mono-functional monomer | Sartomer |
| Isodecylacrylate | mono-functional monomer | Sartomer |
| Genomer ®5275 | Oligomer | RAHN |

2—Ink Formulations

Different photo-curable ink compositions are prepared. Ink formulations #1, #2 and #3 are in accordance with embodiments of the present disclosure. Ink formulations #4, #5 and #6 are comparative ink compositions. Ink formulations 1 to 6 are illustrated in the TABLE (B) below. All percentages are expressed in wt % of the total composition.

Ink formulations #1, #2 and #3 are prepared: Acrylic polymer MB7022 is added, as a 40 wt % solution, in AVES. Cyan pigment (Irgalite® GLVO) is milled with dispersants (Solsperse 32000®) in a bead mill using Propoxylated neopentyl glycol diacrylate as a milling vehicle. The dispersion is then added to the other ingredients in view of obtaining the ink formulations #1, #2 and #3 as presented in TABLE (B).

Comparative ink formulation #4 is prepared: Acrylic polymer MB7022 is added, as a 40 wt % solution, in Propoxylated neopentyl glycol diacrylate. Cyan pigment (Irgalite® GLVO) is milled with dispersant (Solsperse 32000®) in a bead mill using Propoxylated neopentyl glycol diacrylate as a milling vehicle. The dispersion is then added to the other ingredients in view of obtaining the comparative ink formulation #4.

Comparative ink formulation #5 is prepared: Acrylic polymer BR115 is added as a 20 wt % solution in tetrahydrofurfuryl-acrylate. Cyan pigment (Irgalite® GLVO) is milled with dispersant (Solsperse 32000®) in a bead mill using Propoxylated neopentyl glycol diacrylate as a milling vehicle. The dispersion is then added to the other ingredients in view of obtaining the comparative ink formulation #5.

Comparative ink formulation #6 is prepared: Acrylic polymer BR115 is added as a 20 wt % solution in isodecylacrylate. Cyan pigment (Irgalite® GLVO) is milled with dispersant (Solsperse 32000®) in a bead mill using Propoxylated neopentyl glycol diacrylate as a milling vehicle. The dispersion is then added to the other ingredients in view of obtaining the comparative ink formulation #6.

TABLE B

| Ink formulations | # 1 | # 2 | # 3 | # 4 | # 5 | # 6 |
|---|---|---|---|---|---|---|
| Adipic acid divinyl ester (AVES) | 47.5 | 37.7 | 37.7 | — | — | — |
| Ethoxylated (4) pentaerythritol tetraacrylate | 20.3 | — | — | — | — | — |
| Tetraethylene glycol diacrylate | — | 30 | — | — | — | — |
| Propoxylated Ehylene Glycol Diacrylate | — | — | 30 | — | — | — |
| Di-Pentaerythritol Pentaacrylate | — | — | — | 15 | — | — |
| Diethylene glycol butyl ether acrylate | — | — | — | — | 9 | 9 |
| Tetrahydrofurfuryl acrylate | — | — | — | — | 68.6 | 23.6 |
| Isodecylacrylate | — | — | — | — | — | 40 |
| MB7022 | 15 | 15 | 15 | 15 | — | — |
| BR115 | — | — | — | — | 5 | 10 |
| Irgacure ®819 | 3.3 | 3.3 | 3.3 | 3.3 | — | — |
| Irgacure ®907 | 1.1 | 1.1 | 1.1 | 1.1 | 1.5 | 1.5 |
| Irgastab ®UV22 | 0.5 | 0.5 | 0.5 | 0.5 | — | — |
| Irgacure ®1173 | 5.5 | 5.5 | 5.5 | 5.5 | — | — |
| Irgacure ®TPO | — | — | — | — | 4.5 | 4.5 |
| Genomer 5275 ® | — | — | — | — | 2 | 2 |
| Darocur ITX ® | — | — | — | — | 2 | 2 |
| Propoxylated neopentyl glycol diacrylate | 4 | 4 | 4 | 56.7 | 4.2 | 4.2 |
| Irgalite GLVO ® | 2.1 | 2.1 | 2.1 | 2.1 | 2.1 | 2.1 |
| Solsperse ®32000 | 0.7 | 0.7 | 0.7 | 0.7 | 0.7 | 0.7 |
| BYK 307 ® | 0.2 | 0.2 | 0.2 | 0.2 | 0.4 | 0.4 |

3—Ink Testing Procedures

Viscosity testing: The viscosity of the inkjet ink formulations is determined using a HAAKE RS-600 rheometer (Thermo Electron, Newington N.H.) and a TCP/P Peltier controlled unit (Thermo Electron). The viscosity is measured at different temperatures, 50° C. or 40° C. The results are recorded at a shear rate of 4000 l/sec at. Inkjet printheads can handle inks with viscosities from about 4-8 cps to about 18-22 cps at normal jetting temperatures. The jetting temperature cannot be too high; otherwise, it affects thermal stability of the photo-curable inks. Photo-curable inks are not heated with temperature above 50-55° C.

Adhesion testing: The adhesion to various substrates is determined according to the standard method ASTM #D3359/97. The tested substrates are polypropylene (Coroplast®, untreated), rigid PVC, transparent acrylic (polymethylmethacrylate) and polycarbonate. The ink sample is applied to the substrate by draw-down using K Control Coater (available from K Print-Coat Instruments Ltd). The wet thickness of applied layer is 12 µm. The ink is then irradiated under the UV lamp until cured. The adhesion is tested immediately after curing using cross hatch tester (Elcometer®1542 6×1 mm) and 3M® Scotch tape grade 250. The adhesion is evaluated visually and is scored on a scale of 1 to 5 where: a score of 1 illustrates a very poor resistance, a score of 2 illustrates a poor resistance, a score of 3 illustrates a fair resistance, a score of 4 illustrates a good resistance and a score of 5 illustrates a very good resistance.

Curing speed testing: The curing speed of the inkjet ink samples is determined using LC6B bench top conveyer with LH6 UV curing system (available from Fusion UV systems Inc., Gaithersburg Md.). The ink sample is applied to self-adhesive vinyl by draw down using K Control Coater (available from K Print-Coat Instruments Ltd., Litlington, UK) in a thickness of 12 µm. The ink is irradiated once under the UV lamp at different conveyer speeds. The cured ink film is tested by scratching using a paper clip immediately after each pass. The highest speed at which ink could not be scratched is reported as the curing speed.

Elongation testing: Elongation test is performed on a LLOYD instrument "LRX Plus" model using 12 µm thick ink layer. The ink is rod coated on cast vinyl substrate (sold by Hewlett Packard). The coated ink is cured under UV lamp. The gauge length of 33 mm is stretched at the rate of 10 mm/min until the sample is destructed (breaks).

4—Test Results

The results of the test described above, done with the ink formulations #1, #2, #3 and with the comparative ink formulations #4, #5 and #6, are illustrated in the TABLE (C).

TABLE C

| | Ink formulations | | | | | |
|---|---|---|---|---|---|---|
| | # 1 | # 2 | # 3 | # 4 | # 5 | # 6 |
| Viscosity (cps) at 40° C. or 50° C. | 17 (50° C.) | 11 (50° C.) | 18 (50° C.) | 114, (50° C.) | 9 (40° C.) | 18.5 (50° C.) |
| Curing speed (m/s) | 1 | 0.9 | 1.0 | 1.3 | 0.5 | 0.5 |
| Adhesion to polypropylene | 5 | 5 | 5 | 0 | 5 | 5 |
| Adhesion to rigid PVC | 5 | 5 | 5 | 5 | 5 | 5 |
| Adhesion to transparent acrylic | 5 | 5 | 5 | 0 | 5 | 5 |
| Adhesion to polycarbonate | 5 | 5 | 5 | 3 | 5 | 5 |

These results demonstrate that: Ink formulations #1, #2, and #3 have good printing characteristic, i.e. they can be jetted normally and have a good curing speed. Comparative ink formulation #4 has a high viscosity and cannot be jetted. Comparative ink formulations #5 and #6 have "lower curing speed" and do not support high printing speed. Furthermore, ink formulations #1, #2 and #3 have good adhesion properties on different type of substrates. Comparative ink formulation #4 has poor adhesion properties, specifically on polypropylene and on transparent acrylic. Comparative ink formulation #5 has good adhesion properties however has very poor curing speed.

The following TABLE (D) presents the maximum percentage of elongation of ink formulations #1, #2 and #3, prepared as described in example 2, at sample destruction. For comparison, elongation of regular UV-ink (FB221 commercially available from HP) at similar conditions is of about 60%. These results demonstrate that the ink composition according to the present disclosure have excellent elongation properties.

TABLE D

| Ink formulation | Elongation at destruction (%) |
|---|---|
| #1 | 140 |
| #2 | 155 |
| #3 | 138 |

The invention claimed is:

1. A photo-curable ink composition, comprising: an acrylic polymer or copolymer, a vinyl ester component, a multifunctional monomer, a photoinitiator, and a pigment;
    wherein the acrylic polymer or copolymer is selected from the group consisting of styrene acrylic resins, butyl methacrylate resins, isobutyl methacrylate resins, and combinations thereof;
    wherein the multifunctional monomer is selected from the group consisting of ethoxylated (4) pentaerythritol tetra-acrylate, tetraethylene glycol diacrylate, propoxylated ethylene glycol diacrylate, dipentaerythritol penta-acrylate and their combinations;
    and wherein the multifunctional monomer is present, in the photo-curable ink composition, in an amount representing from about 5 to about 35 wt % of the total weight of the ink composition.

2. A photo-curable ink composition, comprising: an isobutyl methacrylate resin, a vinyl ester component, a multifunctional monomer, a photoinitiator, and a pigment.

3. The ink composition, according to claim 1, wherein the vinyl ester component contains a divinyl ester of a dicarboxylic acid.

4. The ink composition, according to claim 1, wherein the vinyl ester component is adipic acid divinyl ester (AVES), cyclohexyl dicarboxylic acid divinyl ester (CHDVES), terephthalic acid divinyl ester (TVES) or any combination thereof.

5. The ink composition, according to claim 1, wherein the vinyl ester components is adipic acid divinyl ester (AVES).

6. The ink composition, according to claim 2, wherein the multifunctional monomer is selected from the group consisting of ethoxylated (4) pentaerythritol tetra-acrylate, tetraethylene glycol diacrylate, propoxylated ethylene glycol diacrylate, dipentaerythritol penta-acrylate and their combinations.

7. A method for forming a printed article, comprising:
    a. providing a photo-curable ink composition containing an isobutyl methacrylate resin, a vinyl ester component, a multifunctional monomer, a photoinitiator and a pigment;
    b. providing a media substrate;
    c. jetting said photo-curable ink composition onto the media substrate; and
    d. applying photo energy to the ink composition once printed on the media substrate, said photo energy having a frequency and energy level suitable for curing the photo-curable ink composition.

8. The method of claim 7, wherein the media substrate is a plastic substrate.

9. The method of claim 7, wherein the media substrate is a polypropylene substrate.

10. The method of claim 7, wherein the media substrate is an acrylic substrate.

11. An ink-jet ink printing system, comprising:
 a. a media substrate;
 b. at least one photo-curable ink composition comprising an isobutyl methacrylate resin, a vinyl ester component, a multifunctional monomer, a photoinitiator and a pigment; and
 c. a photo energy source configured to apply photo energy to the ink composition once printed on a substrate, said photo energy having a frequency and energy level suitable for curing the photo-curable ink-jet ink.

12. The system of claim 11, wherein the photo energy source is a UV light source.

13. A method for preparing a photo-curable ink composition, the method comprising:
 a. providing in combination an isobutyl methacrylate resin, a vinyl ester component, a multifunctional monomer, a photoinitiator and a pigment;
 b. subjecting the combination to conditions under which the ink composition becomes substantially uniform; and
 c. subjecting the combination to filtration.

14. The ink composition, according to claim 2, wherein the vinyl ester component contains a divinyl ester of a dicarboxylic acid.

15. The ink composition, according to claim 2, wherein the vinyl ester component is adipic acid divinyl ester (AYES), cyclohexyl dicarboxylic acid divinyl ester (CH-DVES), terephthalic acid divinyl ester (TVES) or any combination thereof.

16. The ink composition, according to claim 2, wherein the vinyl ester component is adipic acid divinyl ester (AYES).

17. The ink composition, according to claim 2, wherein the multifunctional monomer is an acrylate monomer containing ethylenically unsaturated radiation curable functional groups.

18. The ink composition, according to claim 2, wherein the multifunctional monomer is present, in the photo-curable ink composition, in an amount representing from about 5 to about 35 wt % of the total weight of the ink composition.

* * * * *

UNITED STATES PATENT AND TRADEMARK OFFICE
CERTIFICATE OF CORRECTION

PATENT NO. : 10,000,648 B2
APPLICATION NO. : 14/349055
DATED : June 19, 2018
INVENTOR(S) : Alex Trubnikov et al.

It is certified that error appears in the above-identified patent and that said Letters Patent is hereby corrected as shown below:

In the Claims

In Column 14, Line 10 (approx.), in Claim 15, delete "(AYES)" and insert -- (AVES) --, therefor.

In Column 14, Line 15 (approx.), in Claim 16, delete "(AYES)" and insert -- (AVES) --, therefor.

Signed and Sealed this
Eighth Day of January, 2019

Andrei Iancu
*Director of the United States Patent and Trademark Office*